(12) United States Patent
Ogawa et al.

(10) Patent No.: US 6,991,287 B1
(45) Date of Patent: Jan. 31, 2006

(54) VEHICLE SEAT SYSTEM

(75) Inventors: Kazuharu Ogawa, Hiroshima (JP);
Hideki Yokoyama, Hiroshima (JP);
Kouji Matsushita, Hiroshima (JP);
Kenji Muramatsu, Hiroshima (JP);
Naoki Kaneko, Hiroshima (JP)

(73) Assignees: Toyo Seat Co., Ltd., Osaka (JP);
Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/143,702

(22) Filed: Jun. 2, 2005

(30) Foreign Application Priority Data

Jun. 25, 2004 (JP) .............................. 2004-188039

(51) Int. Cl.
*B60N 2/42* (2006.01)

(52) U.S. Cl. .............................. 297/216.12; 297/216.13

(58) Field of Classification Search .......... 297/216.12, 297/216.13, 216.14, 216.1, 408, 284.4
See application file for complete search history.

(56) References Cited

U.S. PATENT DOCUMENTS 5,927,804 A * 7/1999 Cuevas .................. 297/216.12
6,871,913 B2 * 3/2005 Malsch et al. .............. 297/410
6,890,029 B2 * 5/2005 Svantesson ............ 297/216.12
2004/0070240 A1 * 4/2004 Håland et al. ......... 297/216.12
2004/0119324 A1 * 6/2004 Humer et al. .......... 297/216.12
2004/0155496 A1 * 8/2004 Farquhar et al. ....... 297/216.12

FOREIGN PATENT DOCUMENTS

| JP | 2000-325179 | 11/2000 |
|---|---|---|
| JP | 2002-345595 | 12/2002 |

* cited by examiner

*Primary Examiner*—Milton Nelson, Jr.
(74) *Attorney, Agent, or Firm*—Brooks Kushman P.C.

(57) ABSTRACT

In a vehicle seat system equipped with an active headrest mechanism (30) and a lumbar support (21), a load-receiving part (32) of the active headrest mechanism (30) is positioned behind the lumbar support (21) as viewed from front of the seat. The vehicle seat system is arranged so that when a specified amount or more of load is applied from front of the seat to a lumbar support plate (22) of the lumbar support (21), one end part of a plate support member (23) supporting the lumbar support plate (22) exits from an insertion hole (17) provided at a side frame (4) to disengage from a seatback frame (2), and the disengaged end part of the plate support member (23) then abuts on the load-receiving part (32).

5 Claims, 3 Drawing Sheets

VEHICLE SEAT SYSTEM

CROSS-REFERENCES TO RELATED APPLICATIONS

This application claims priority under 35 USC 119 to Japanese Patent Application No. 2004-188039, filed on Jun. 25, 2004, the entire contents of which are incorporated herein by reference.

BACKGROUND OF THE INVENTION (a) Field of the Invention

This invention relates to the field of vehicle seat systems equipped with an active headrest mechanism for moving a headrest to front of a seat when receiving a load from the seat occupant in the event of a rear-end collision with another vehicle, and a lumbar support mounted on a seatback frame in a seatback for position adjustment in the front and back direction of the seat.

(b) Description of the Related Art

Active headrest mechanisms have been known that reduce whiplash injuries of seat occupants in rear-end collisions with another vehicle such as a car. The whiplash injury reduction is implemented by moving a headrest at the top of a seatback to front of the seat (i.e., moving toward the head of the seat occupant) when a load from front of the seat acts on a load-receiving part placed in the seatback (see, for example, Japanese Patent Application Publication No. 2000-325179). Such an active headrest mechanism is required, in rear-end collisions, to early move the headrest to front of the seat (toward the seat occupant) and obtain a large amount of the movement. To satisfy this requirement, it is preferable to place the load-receiving part substantially at the same height as the seat occupant's lumbar as disclosed in Japanese Patent Application Publication No. 2000-325179.

Some of vehicle seat systems have a lumbar support provided in the seatback substantially at the same height as the seat occupant's lumbar to support his lumbar, and the lumbar support is adjustable in position in the front and back direction of the seat. Further, there are also known vehicle seat systems into which an active headrest mechanism as described above is assembled together with such a lumbar support (see, for example, Japanese Patent Application Publication No. 2002-345595). In such a vehicle seat system, a lumbar support plate for supporting the seat occupant's lumbar is mounted at its bottom end to a seatback frame, a crank-shaped rod is engaged with the vertically middle part of the lumbar support plate, and the lumbar support plate can be moved in its vertical middle (i.e., at the same height as the seat occupant's lumbar) in the front and back direction of the seat relative to the seatback frame by the crank-shaped rod. Further, a headrest support member spans the top ends of both side frames of the seatback frame for pivotal movement about an axis extending in the lateral direction of the seat. Furthermore, a load-receiving member is attached at one end to the headrest support member so that the other end adjoins the top end portion of the back face of the lumbar support plate (the surface thereof toward the back of the seat) to form a load-receiving part. Thus, when a large load is applied from the seat occupant to the top end portion of the lumbar support plate in a rear-end collision, the load is transported through the lumbar support plate to the load-receiving part, so that the headrest support member pivotally moves to move the headrest to front of the seat.

In the known vehicle seat systems with an active headrest mechanism and a lumbar support, however, it is difficult to place the load-receiving part of the active headrest mechanism substantially at the same height as the seat occupant's lumbar. Specifically, where the load-receiving part is placed on the vertical middle portion of the back face of the lumbar support plate, the vertical middle point of the lumbar support plate varies in the front and back direction of the seat according to the position adjustment of the lumbar support plate in the front and back direction of the seat. As a result, a load in a rear-end collision may not act on the load-receiving part depending on the position of the lumbar support plate or the headrest may be unwantedly moved by the position adjustment of the lumbar support plate. In order to solve these problems, it is necessary to vertically elongate the lumbar support plate and place the load-receiving part on the top end portion of the back face of the lumbar support plate, i.e., away from the seat occupant's lumbar, as disclosed in the above-mentioned Japanese Patent Application Publication No. 2002-345595. With this arrangement, however, load input to the load-receiving part in a rear-end collision is delayed and the amount of movement of the headrest is small.

SUMMARY OF THE INVENTION

The present invention has been made in view of the foregoing points, and its object is to provide a vehicle seat system that includes an active headrest mechanism and a lumbar support as described above and that is designed to early move the headrest to front of the seat and obtain a large amount of movement of the headrest in a rear-end collision, thereby improving the ability of seat occupant protection, while preventing unwanted movement of the headrest due to position adjustment of the lumbar support in the front and back direction of the seat.

To attain the above object, in a vehicle seat system of the present invention, the lumbar support is arranged to disengage from the seatback frame when a specified amount or more of load is applied from front of the seat to the lumbar support, and the active headrest mechanism has a load-receiving part that is hit by the lumbar support having disengaged from the seatback frame and thereby receives the load applied to the lumbar support.

More specifically, a vehicle seat system comprises: a seatback; and a headrest placed at the top of the seatback, the seatback comprises: a seatback frame; a lumbar support that is mounted on the seatback frame for position adjustment in the front and back direction of the seat and is arranged to disengage from the seatback frame when a specified amount or more of load is applied from front of the seat to the lumbar support; and an active headrest mechanism that is placed behind the lumbar support as viewed from front of the seat, connected to the headrest, and moves the headrest to front of the seat when receiving the load from front of the seat, wherein the active headrest mechanism has a load-receiving part which is hit by the lumbar support having disengaged from the seatback frame and thereby receives the load applied to the lumbar support.

With this structure, when the load-receiving part of the active headrest mechanism is positioned a sufficient distance behind the lumbar support as viewed from front of the seat, the headrest does not move by the effect of position adjustment of the lumbar support in the front and back direction of the seat even if the load-receiving part is positioned substantially at the same height as the seat occupant's lumbar. Further, when the specified amount or more of load is applied from the seat occupant to the lumbar support in a rear-end collision, the lumbar support disengages from the seatback frame. Therefore, even if the load-receiving part is positioned a distance away behind the lumbar support as viewed from front of the seat, the lumbar support moves toward the back of the seat and abuts on the load-receiving part with reliability. As a result, in a rear-end collision, the load applied to the lumbar support is applied from front to the load-receiving part so that the headrest moves to front of the seat. Accordingly, when the load-receiving part is positioned substantially at the same height as the seat occupant's lumbar, the time of load input to the load-receiving part in a rear-end collision can be advanced to early move the headrest to front of the seat and a large amount of movement of the headrest can be provided.

In a preferred embodiment of the vehicle seat system of the invention, an operating part for adjusting the position of the lumbar support in the front and back direction of the seat is disposed at one lateral side of the seat, the seatback frame has two substantially vertically extending side frames in the respective vicinities of both lateral ends of the seatback, the lumbar support comprises: a lumbar support plate disposed substantially at the same height as the lumbar of a seat occupant; and a plate support member that extends in the lateral direction of the seat, has both end parts supported to both the side frames, respectively, and mounts the lumbar support plate in the substantially lateral middle thereof, one said end part of the plate support member is supported to one of the side frames closer to the operating part and connected to the operating part, and the other said end part of the plate support member is inserted into an insertion hole provided at the other side frame and is arranged to exit from the insertion hole and disengage from the seatback frame when the specified amount or more of load is applied from front of the seat to the lumbar support plate.

With this structure, when a load is applied from front of the seat to the lumbar support plate, the plate support member deflects toward the back of the seat and the deflection of the plate support member causes said other end part thereof to shift laterally inside the seat. When the amount of deflection of the plate support member in the middle of its length reaches a specified value corresponding to the specified amount of load, said other end part of the plate support member exits from the insertion hole so that the lumbar support moves toward the back of the seat and abuts on the load-receiving part. In other words, if the amount of insertion of said other end part of the plate support member into the insertion hole is previously selected so that said other end part thereof exits from the insertion hole when the specified amount of deflection is reached, said other end part of the plate support member exits from the insertion hole when the specified amount or more of load is applied to the load-receiving part. Therefore, the lumbar support can be made simply by changing the structure of said other end part of the plate support member while using the existing structure for position adjustment of the lumbar support.

It is preferable that a projecting member projecting toward said one side frame is provided on said other side frame, and the insertion hole is formed in an end surface of the projecting member.

In this case, said other end part of the plate support member is away from said other side frame inwardly in the lateral direction of the seat. Therefore, when said other end part of the plate support member exits from the insertion hole, it can be prevented that said other end part thereof interferes with said other side frame to fail to further move toward the back of the seat. This ensures that the lumbar support abuts on the load-receiving part.

In a preferred embodiment, the active headrest mechanism comprises a frame body composed of: both side pieces that pass behind both the end parts, respectively, of the plate support member as viewed from front of the seat and extend substantially vertically; an upper piece that connects the upper ends of both the side pieces and mounts the headrest; and a lower piece that connects the lower ends of both the side pieces, both the side pieces of the frame body are supported to both the side frames, respectively, at a height somewhere between the upper piece of the frame body and the plate support member to turn about associated pivot shafts extending in the lateral direction of the seat, the load-receiving part is constituted by part of one said side piece of the frame body located behind said other end part of the plate support member as viewed from front of the seat, and said other end part of the plate support member is arranged to exit from the insertion hole and abuts on the part of the side piece of the frame body serving as the load-receiving part when the specified amount or more of load is applied from front of the seat to the lumbar support plate.

In this case, since said other end part of the plate support member hardly deflects and does not move in the front and back direction of the seat even in the event of position adjustment of the lumbar support plate, the load-receiving part can be positioned in proximity to said other end part of the plate support member. Therefore, as compared with the case where the longitudinally middle portion of the plate support member or the lumbar support plate is caused to abut on the load-receiving part positioned behind itself as viewed from front of the seat, the time of load input to the load-receiving part can be advanced, thereby moving the headrest to front of the seat more early.

DETAILED DESCRIPTION OF THE INVENTION

A preferred embodiment of the present invention will be described with reference to the drawings.

Figure 1:
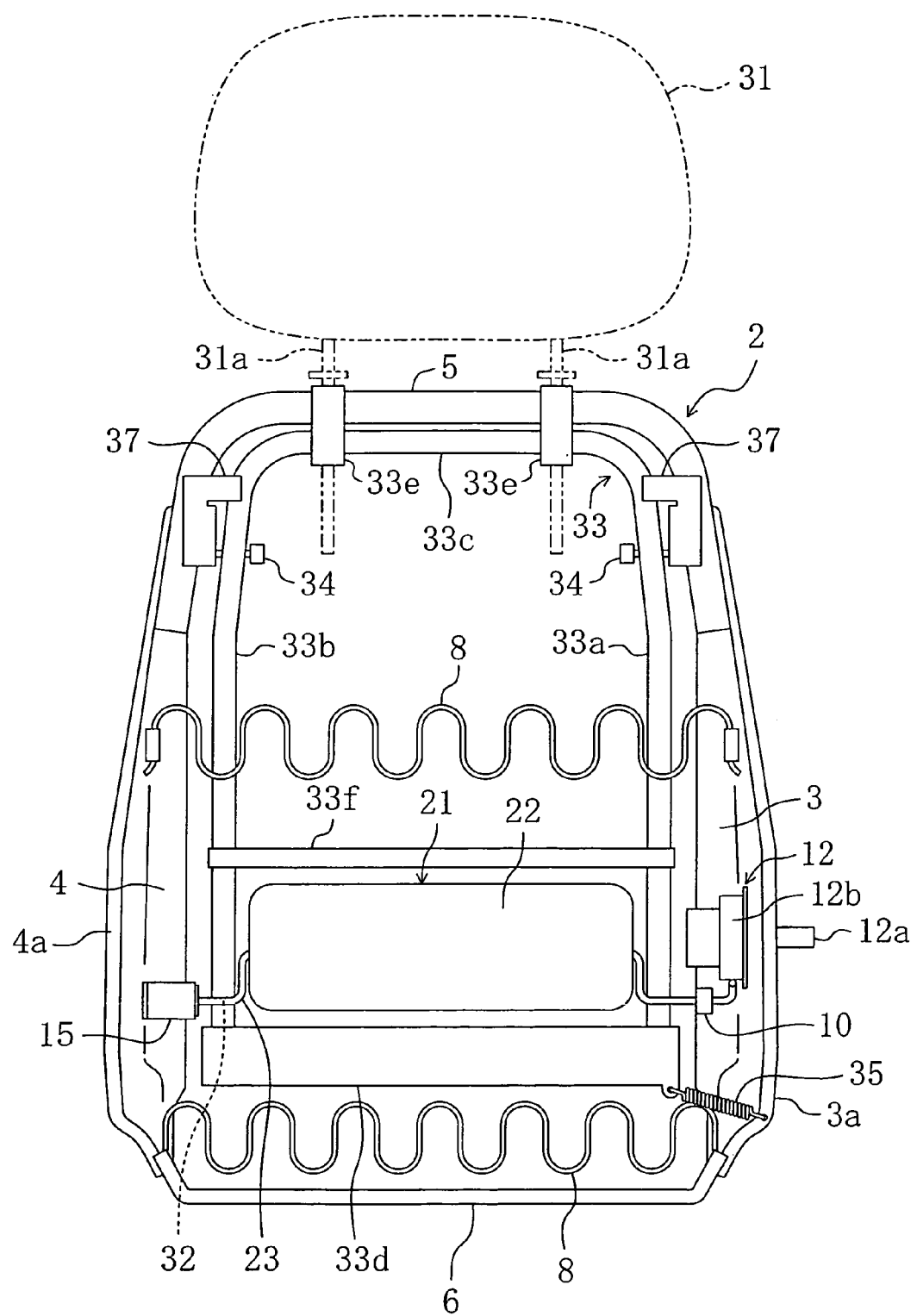
FIG. 1 is a front view showing the inside of a seatback of a seat in a vehicle seat system according to an embodiment of the invention.

FIG. 1 shows the inside structure of a seatback 1 (see FIG. 2) of a seat in a vehicle seat system according to an embodiment of the invention. A seatback frame 2 having a substantially rectangular shape when viewed from front of the seat is disposed inside the seatback 1. The seatback frame 2 has two substantially vertically extending side frames 3 and 4 in the respective vicinities of both lateral ends of the seatback 1, an upper cross member 5 connecting the upper ends of both the side frames 3 and 4, and a lower cross member 6 connecting the lower ends of both the side frames 3 and 4. The outside ends of the side frames 3 and 4 are formed with sidewalls 3a and 4a, respectively, that extend to front of the seat. The sidewalls 3a and 4a are provided to correspond to the positions of side supports formed at both lateral ends of the backrest surface of the seatback 1 to project to front of the seat. In FIG. 1, reference numeral 8 denotes a seat spring (zigzag spring) spanning the sidewalls 3a and 4a of both the side frames 3 and 4.

The seatback 1 of the seat has a lumbar support 21 mounted to the seatback frame 2 in the seatback 1 for position adjustment in the front and back direction of the seat in order to support the lumbar of the person sitting on the seat (i.e., the seat occupant). Specifically, the lumbar support 21 has a lumbar support plate 22 placed substantially at the same height as the lumbar of the seat occupant, and a plate support member 23 of circular cross section extending in the lateral direction of the seat and supported at both ends to both the side frames 3 and 4, respectively. The plate support member 23 is formed into a crank-like shape by making its substantially middle part in the longitudinal direction (the lateral direction of the seat) eccentric with respect to both end parts. The lumbar support plate 22 is mounted to the substantially longitudinally middle part of the plate support member 23. One end part of the plate support member 23 (the right end part thereof in FIG. 1) is pivotally supported to a bearing member 10 fixedly attached to the side frame 3 located at one lateral side of the seat (at the right side thereof in FIG. 1). On the other hand, the other end part of the plate support member 23 (the left end part thereof in FIG. 1) is inserted into an insertion hole 17 provided at the side frame 4 located at the other lateral side of the seat (at the left side thereof in FIG. 1), and is pivotally supported thereto. The insertion hole 17 will be described later in detail (see FIG. 4).

The one end part of the plate support member 23 is in turn operatively connected to an operating member (not shown) for operating the position adjustment of the lumbar support plate 22 in the front and back direction of the seat. Specifically, an operatively associated member 12 is mounted on the sidewall 3a of the side frame 3 at the one lateral side of the seat to cooperate with the operation of the operating member. The operating member and the operatively associated member 12 constitute an operating part. The operatively associated member 12 has a shaft 12a passing through the sidewall 3a in the lateral direction of the seat and supported to the sidewall 3a for pivotal movement about its axis, and a cam 12b mounted on the inner surface of the sidewall 3a for unitarily pivotal movement with the shaft 12a. The operating member is attached to part of the shaft 12a located outside the seat. Thus, when the shaft 12a is turned about its axis by the operation of the operating member, the cam 12b turns accordingly. Further, a portion of the one end part of the plate support member 23 located distal to the bearing member 10 is folded to front of the seat to engage in abutment with the cam 12b. Thus, when the cam 12b turns in association with the operating member, the folded portion of the plate support member 23 vertically moves and both the end parts of the plate support member 23 thereby turn about their axes. When both end parts of the plate support member 23 turn, the substantially longitudinally middle part of the plate support member 23 eccentric to both end parts moves in the front and back direction of the seat. In this manner, with an operation of the operating member, the lumbar support plate 22 mounted to the substantially longitudinally middle part of the plate support member 23 can be adjusted in position in the front and back direction of the seat. The lumbar support plate 22 is mounted pivotally to the substantially longitudinally middle part of the plate support member 23 in order that the front surface thereof can be held in a substantially perpendicular position when it is moved in the front and back direction of the seat.

Figure 3:
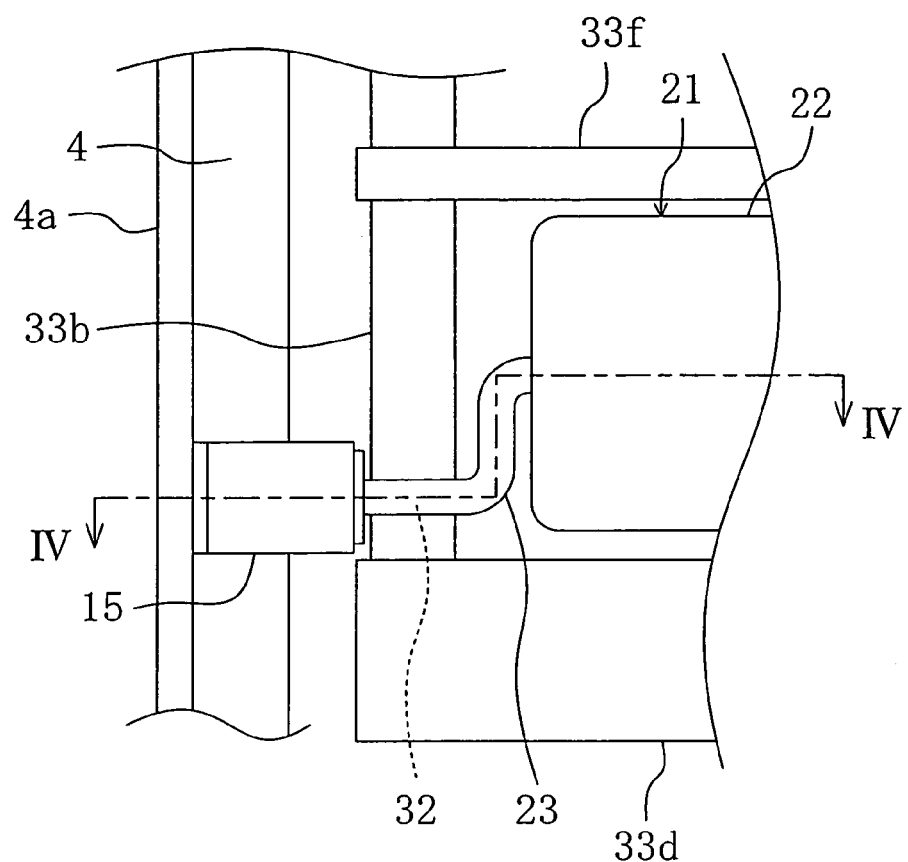
FIG. 3 is an enlarged front view showing an end part of a plate support member which is inserted into an insertion hole.
Figure 4:
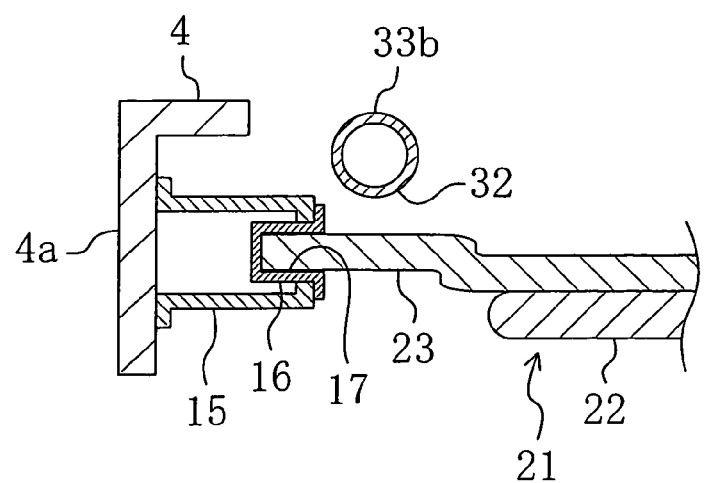
FIG. 4 is a cross section taken along the line IV—IV of FIG. 3.

As shown in enlarged manner in FIGS. 3 and 4, the insertion hole 17 into which said other end part of the plate support member 23 is inserted is formed at an end surface of a projecting member 15 provided on said other side frame 4 to project toward said one side frame 3. More specifically, the projecting member 15 is fixed on the inside surface of the sidewall 4a of said other side frame 4 to project inwardly in the lateral direction of the seat. The end surface of the projecting member 15 (the surface thereof facing the inside of the seat) is located more inwardly in the lateral direction of the seat than said other side frame 4. A bearing member 16 is fixed to the distal end surface of the projecting member 15. The insertion hole 17 is formed by the inside surfaces of the bottom and sidewall of the bearing member 16. Said other end part of the plate support member 23 is fitted into the insertion hole 17. The amount of insertion of said other end part of the plate support member 23 into the insertion hole 17 is set at a value at which said other end part of the plate support member 23 exits from the insertion hole 17 in a rear-end collision as described later.

The lumbar support 21 is arranged to disengage from the seatback frame 2 when a specified amount or more of load is applied from front of the seat to the lumbar support plate 22 of the lumbar support 21. Specifically, when a load is applied from front of the seat to the lumbar support plate 22 of the lumbar support 21, the plate support member 23 deflects to back of the seat. This deflection causes said other end part of the plate support member 23 to shift inwardly in the lateral direction of the seat, thereby decreasing the amount of insertion of the plate support member 23 into the insertion hole 17. Then, when the amount of deflection of the plate support member 23 at its longitudinal middle position reaches a specified value corresponding to the specified amount of load, said other end part of the plate support member 23 slips out of the insertion hole 17 so that the lumbar support 21 is disengaged from the seatback frame 2. In this manner, the amount of insertion of said other end part of the plate support member 23 into the insertion hole 17 is selected so that when the amount of deflection of the plate support member 23 reaches the specified value, said other part of the plate support member 23 exits from the insertion hole 17.

Figure 2:
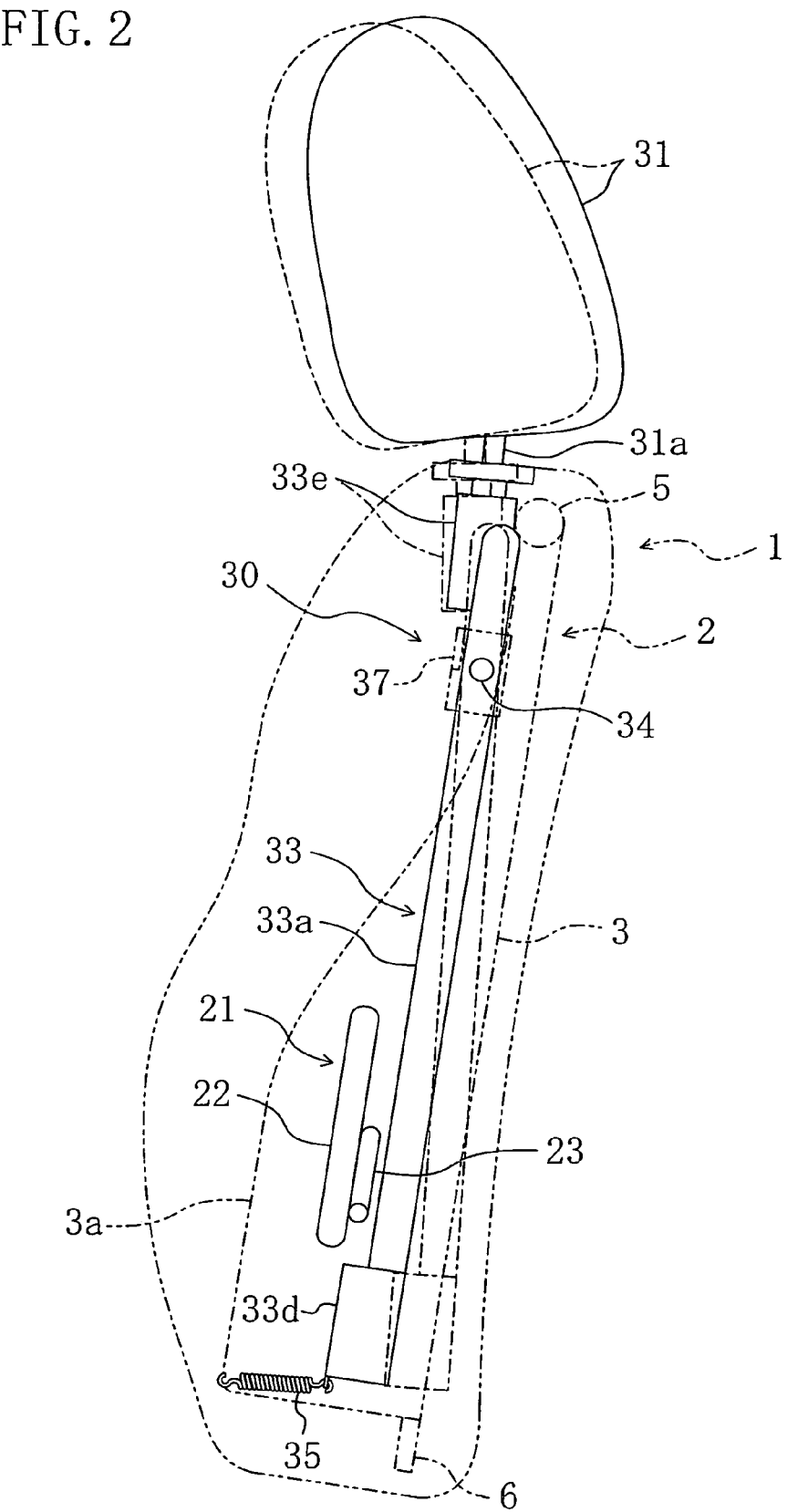
FIG. 2 is a side view showing the structure of an active headrest mechanism.

Furthermore, as shown in FIGS. 1 and 2, the seat has an active headrest mechanism 30 connected to a headrest 31 disposed at the top of the seatback 1 (i.e., behind the seat occupant's head). The active headrest mechanism 30 has a load-receiving part 32 positioned inside the seatback 1 and a distance away behind the lumbar support 21 as viewed from front of the seat, and is arranged to move the headrest 31 to front of the seat (toward the seat occupant's head) when the load-receiving part 32 receives a load from front of the seat.

More specifically, the active headrest mechanism 30 has a frame body 33 composed of both side pieces 33a and 33b that pass behind both end parts, respectively, of the plate support member 23 as viewed from front of the seat and then extend substantially vertically, an upper piece 33c connecting the upper ends of both the side pieces 33a and 33b, and a lower piece 33d connecting the lower ends of both the side pieces 33a and 33b. The upper piece 33c of the frame body 33 is provided with cylindrical headrest mounting parts 33e and 33e into which are inserted frames 31a and 31a extending downward from the bottom of the headrest 31. The mounting of the headrest 31 on the upper piece 33c of the frame body 33 is implemented by inserting the frames 31a and 31a into the headrest mounting parts 33e and 33e, respectively. Further, a reinforcing member 33f is disposed just above the lumbar support plate 22 to connect both the side pieces 33a and 33b for the purpose of reinforcement.

Both the side frames 3 and 4 have pivot shafts 34 and 34, respectively, disposed at a height somewhere between the upper piece 33c of the frame body 33 and the plate support member 23 to extend in the lateral direction of the seat (where both pivot shafts 34 and 34 lie in line). Both the side pieces 33a and 33b of the frame body 33 are supported to both the side frames 3 and 4 for pivotal movement about the pivot shafts 34 and 34, respectively. In other words, the frame body 33 is mounted to the seat frame 2 for pivotal movement about the pivot shafts 34 and 34. A tension coil spring 35 is stretched between the lower end of the sidewall 3a of said one side frame 3 and the associated one end of the lower piece 33d of the frame body 33. The lower piece 33d of the frame body 33 tends to move to front of the seat by the bias of the tension coil spring 35, that is, the frame body 33 tends to turn about the pivot shafts 34 and 34 clockwise in FIG. 2. Since, however, the headrest mounting parts 33e and 33e provided at the upper piece 33c of the frame body 33 abuts on the upper cross member 5 of the seatback frame 2, the turning of the frame body 33 is restrained. The bias of the tension coil spring 35 is set at such a value that when the load-receiving part 32 receives a load from said other end part of the plate support member 23 in a rear-end collision as described later, the frame body 33 turns about the pivot shafts 34 and 34 against the bias, but that otherwise in normal conditions, it does not turn as even if the seat occupant pushes the headrest 31 to front of the seat.

In this embodiment, the load-receiving part 32 is constituted by part of the side piece of the frame body 33 behind said other end part of the plate support member 23 as viewed from front of the seat, i.e., part of the side piece 33b at said other side of the seat (the left side in FIG. 1), and is positioned substantially at the same height as the seat occupant's lumbar. When, as described above, the specified amount or more of load is applied from front of the seat to the lumbar support plate 22 and said other end part of the plate support member 23 thereby exits from the insertion hole 17, said other end part of the plate support member 23 moves toward the back of the seat and then abuts on part of the side piece 33b serving as the load-receiving part 32.

When said other end part of the plate support member 23 abuts on the load-receiving part 32, the load-receiving part 32 receives the load having been applied to the lumbar support plate 22. This load input to the load-receiving part 32 causes the frame body 33 to turn about the pivot shafts 34 and 34 counterclockwise in FIG. 2 against the bias of the tension coil spring 35, so that the upper piece 33c of the frame body 33 and the headrest 31 move to front of the seat (see the dash-single-dot lines in FIG. 2). Restriction members 37 and 37 are disposed on portions of both the side frames 3 and 4 above the pivot shafts 34 and 34, respectively, for the purpose of restricting the counterclockwise turning of the frame body 33 to prevent the headrest 31 from moving to front of the seat beyond a certain amount.

The side piece 33b of the frame body 33 constituting the load-receiving part 32 in the active headrest mechanism 30 is placed away from said other end part of the plate support member 23 of the lumbar support 21 toward the back of the seat. Therefore, even if the seat occupant operates the operating member to carry out position adjustment of the lumbar support plate 22 in the front and back direction of the seat, the lumbar support 21 does not abut on the frame body 33. The distance between said other end part of the plate support member 23 and the load-receiving part 32 needs to be at least the distance at which said other end part can abut on the load-receiving part 32 after it exits from the insertion hole 17. In order to achieve an early load input to the load-receiving part 32, however, it is preferable to bring said other end part of the plate support member 23 and the load-receiving part 32 into proximity with each other as much as possible. In this respect, since said other end part of the plate support member 23 in this embodiment hardly deflects and does not move in the front and back direction of the seat as a result of position adjustment of the lumbar support plate 22, said other end part of the plate support member 23 and the load-receiving part 32 can be brought into a good proximity with each other.

When a vehicle mounting the seat according to this embodiment is rammed from behind by another vehicle and the specified amount or more of load is thereby applied from the seat occupant to the lumbar support plate 22, the amount of deflection of the plate support member 23 at the vertical middle point reaches or exceeds the specified value so that said other end part of the plate support member 23 exits from the insertion hole 17. In other words, the lumbar support 21 is disengaged from the seatback frame 2. This disengagement of the lumbar support 21 causes said other end part of the plate support member 23 to move toward the back of the seat and then abut on the load-receiving part 32 behind said other end part. In addition, the load from the seat occupant is also applied through an unshown seat cushion to a portion of the frame body 33 other than the load-receiving part 32 (a portion thereof below the pivot shaft 34). As a result, the frame body 33 turns counterclockwise about the pivot shafts 34 and 34 so that the upper piece 33c of the frame body 33 and the headrest 31 move to front of the seat. Thus, the headrest 31 supports the seat occupant's head. If the movement of the lumbar support plate 22 of the lumbar support 21 after disengaging from the seatback frame 2 deviates upward or downward, the lumbar support plate 22 abuts on the reinforcing member 33f or the lower piece 33d of the frame body 33, thereby restraining the upward or downward deviation.

According to this embodiment, since the load-receiving part 32 of the active headrest mechanism 30 is positioned substantially at the same height as the seat occupant's lumbar and the part of the side piece 33b of the frame body 33 serving as the load-receiving part 32 is positioned a distance away behind said other end part of the lumbar support 21 as viewed from front of the seat, the headrest 31 does not move by the effect of position adjustment of the lumbar support 21 (lumbar support plate 22) in the front and back direction of the seat. Further, since the load-receiving part 32 is positioned substantially at the same height as the seat occupant's lumbar, the time of load input to the load-receiving part 32 in a rear-end collision can be advanced to early move the headrest 31 to front of the seat and a large amount of movement of the headrest 31 can be provided.

In the above embodiment, the load-receiving part 32 is constituted by part of the side piece 33b of the frame body 33 behind said other end part of the plate support member 23 as viewed from front of the seat. Alternatively, the load-receiving part 32 may be positioned behind the longitudinal middle part of the plate support member 23 or behind the lumbar support plate 22 as viewed from front of the seat so that the longitudinal middle part of the plate support member 23 or the lumbar support plate 22 could abut on the load-receiving part 32 after said other end part of the plate support member 23 exits from the insertion hole 17. Since said other end part of the plate support member 23 hardly deflects and does not move in the front and back direction of the seat by the effect of position adjustment of the lumbar support plate 22, however, it is preferable to position the load-receiving part 32 behind said other end part of the plate support member 23 as viewed from front of the seat as in the above embodiment. The reason for this is that the load-receiving part 32 can be brought into proximity with the lumbar support 21 to make the load input to the load-receiving part 32 as early as possible.

Instead of disengagement of said other end part alone of the plate support member 23, both end parts thereof may be disengaged from the seatback frame 2. Alternatively, the seat of the invention may be arranged so that only said one end part of the plate support member 23 operatively connected to the operating member is disengaged from the seatback frame 2.

Further, in the above embodiment, said other end part of the plate support member 23 slips out of the insertion hole 17 using the deflection of the plate support member 23. Alternatively, a cylindrical member having a peripheral wall split at a circumferential point (a point toward the back of the seat) along its length, i.e., a cylindrical member of substantially C-shaped cross section, may be mounted on one of the side frames, the center hole of the cylindrical member may be used as an insertion hole 17 into which one end part of the plate support member 23 is inserted, and the one end part of the plate support member 23 may be arranged to exit from the insertion hole 17 by passing through the split in the cylindrical member when a specified amount or more of load is applied from front of the seat to the lumbar support plate 22.

Furthermore, the structures of the lumbar support plate 21 and the active headrest mechanism 30 are not limited, unless the load-receiving part 32 of the active headrest mechanism 30 is positioned behind the lumbar support 21 as viewed from front of the seat and the lumbar support 21 exits from the seatback frame 2 and abuts on the load-receiving part 32 when receiving a specified amount or more of load from front of the seat. For example, the present invention is applicable to the structure in which the lumbar support 21 is formed of a fabric member placed between both the side frames 3 and 4 of the seatback frame 2 and adjusted in its position in the front and back direction of the seat by changing the tension of the fabric member. In this case, the active headrest mechanism can be implemented by a structure in which the load-receiving part 32 is positioned behind the substantially laterally middle portion of the fabric member and, on application of a specified amount or more of load from the seat occupant to the fabric member, the fabric member exits from engagement with the seatback frame 2 by breakage due to the load so that the seat occupant directly abuts on the load-receiving part 32. The active headrest mechanism 30 is not limited to the structure in which the headrest 31 turns about the pivot shafts 34 and 34, but may be the structure in which the headrest 31 is moved up and to front of the seat using a link mechanism (see Japanese Patent Application Publication No. 2000-325179).

What is claimed is:

1. A vehicle seat system comprising:
 a seatback; and
 a headrest placed at the top of the seatback,
 the seatback comprising:
 a seatback frame;
 a lumbar support that is mounted on the seatback frame for position adjustment in the front and back direction of the seat system and is arranged to disengage from the seatback frame when a specified amount or more of load is applied from front of the seat system to the lumbar support; and
 an active headrest mechanism that is placed behind the lumbar support as viewed from front of the seat system, connected to the headrest, and moves the headrest to front of the seat system when receiving the load from front of the seat system, wherein
 the active headrest mechanism has a load-receiving part which is hit by the lumbar support having disengaged from the seatback frame and thereby receives the load applied to the lumbar support.

2. The vehicle seat system of claim 1, wherein
 an operating part for adjusting the position of the lumbar support in the front and back direction of the seat system is disposed at one lateral side of the seat system,
 the seatback frame has two substantially vertically extending side frames in the respective vicinities of both lateral ends of the seatback,
 the lumbar support comprises:
 a lumbar support plate; and
 a plate support member that extends in the lateral direction of the seat system, has both end parts supported to both the side frames, respectively, and mounts the lumbar support plate substantially in the middle of the length of the plate support member,
 one said end part of the plate support member is supported to one of the side frames closer to the operating part and engaged with the operating part, and
 the other said end part of the plate support member is inserted into an insertion hole provided at the other side frame and is arranged to exit from the insertion hole and disengage from the seatback frame when the specified amount or more of load is applied from front of the seat system to the lumbar support plate.

3. The vehicle seat system of claim 2, wherein
 a projecting member projecting toward said one side frame is provided on said other side frame, and
 the insertion hole is formed in an end surface of the projecting member.

4. The vehicle seat system of claim 3, wherein
 the active headrest mechanism comprises a frame body composed of: two side pieces that pass behind both the end parts, respectively, of the plate support member as viewed from front of the seat system and extend substantially vertically; an upper piece that connects the upper ends of both the side pieces and mounts the headrest; and a lower piece that connects the lower ends of both the side pieces,
 both the side pieces of the frame body are supported to both the side frames, respectively, at a height somewhere between the upper piece of the frame body and the plate support member to turn about associated pivot shafts extending in the lateral direction of the seat system,
 the load-receiving part of the active headrest mechanism is constituted by part of one said side piece of the frame body located behind said other end part of the plate support member as viewed from front of the seat system, and
 said other end part of the plate support member is arranged to exit from the insertion hole and abuts on the part of the side piece of the frame body serving as the load-receiving part when the specified amount or more of load is applied from front of the seat system to the lumbar support plate.

5. The vehicle seat system of claim 2, wherein
 the active headrest mechanism comprises a frame body composed of: bo two side pieces that pass behind both the end parts, respectively, of the plate support member as viewed from front of the seat system and extend substantially vertically; an upper piece that connects the top ends of both the side pieces and mounts the headrest; and a lower piece that connects the bottom ends of both the side pieces, both the side pieces of the frame body are supported to both the side frames, respectively, at a height somewhere between the upper piece of the frame body and the plate support member to turn about associated pivot shafts extending in the lateral direction of the seat system, the load-receiving part of the active headrest mechanism is constituted by part of the side piece of the frame body located behind said other end part of the plate support member as viewed from front of the seat system, and said other end part of the plate support member is arranged to exit from the insertion hole and abuts on the part of the side piece of the frame body serving as the load-receiving part when the specified amount or more of load is applied from front of the seat system to the lumbar support plate.

* * * * *

UNITED STATES PATENT AND TRADEMARK OFFICE
CERTIFICATE OF CORRECTION

PATENT NO. : 6,991,287 B1 Page 1 of 1
DATED : January 31, 2006
INVENTOR(S) : Kazuharu Ogawa et al.

It is certified that error appears in the above-identified patent and that said Letters Patent is hereby corrected as shown below:

<u>Column 10,</u>
Line 64, delete "bo".

Signed and Sealed this

Twenty-fifth Day of April, 2006

JON W. DUDAS
*Director of the United States Patent and Trademark Office*